US012722963B2

(12) United States Patent
Abelli et al.

(10) Patent No.: US 12,722,963 B2
(45) Date of Patent: Sep. 1, 2026

(54) APPARATUS FOR TREATING CONTAINERS ADVANCING ALONG A LINEAR DIRECTION

(71) Applicant: GEA PROCOMAC S.p.A, Sala Baganza (IT)

(72) Inventors: Paolo Abelli, Sala Baganz (IT); Vittorio Bellini, Sala Baganza (IT); Marco Squeri, Sala Baganza (IT)

(73) Assignee: GEA Procomac S.p.A, Sala Baganza (IT)

( * ) Notice: Subject to any disclaimer, the term of this patent is extended or adjusted under 35 U.S.C. 154(b) by 0 days.

(21) Appl. No.: 19/070,731

(22) Filed: Mar. 5, 2025

(65) Prior Publication Data

US 2025/0282602 A1 Sep. 11, 2025

(30) Foreign Application Priority Data

Mar. 8, 2024 (IT) ........................ 102024000005218

(51) Int. Cl.
*B67C 7/00* (2006.01)

(52) U.S. Cl.
CPC .......... *B67C 7/0006* (2013.01); *B67C 7/0073* (2013.01); *B67C 2007/006* (2013.01); *B67C 2007/0066* (2013.01)

(58) Field of Classification Search
CPC ................ B67C 7/0006; B67C 7/0073; B67C 2007/006; B67C 2007/0066; B29C 2049/023; B29C 2049/4632; B29C 2049/4635; B29C 2049/4655; B29C 49/42405; B29C 49/42418; B29C 49/46; B29C 49/42802; B65G 54/025
See application file for complete search history.

(56) References Cited

U.S. PATENT DOCUMENTS

2021/0269260 A1* 9/2021 Wallisch ................. B01L 1/025
2024/0059541 A1* 2/2024 Hayakawa ................ A61L 2/22

FOREIGN PATENT DOCUMENTS

IT MO20130131 A1 * 11/2014 ........... B65G 54/025
JP H0551087 A 3/1993

OTHER PUBLICATIONS

Machine Translation of ITMO20130131A1 (Year: 2014).*
Search Report on Italian Application No. IT202400005218 issued Mar. 8, 2024, 31 pages, Ministero delle Imprese e del Made in Italy, The Hague, NL.

* cited by examiner

*Primary Examiner* — Veronica Martin
(74) *Attorney, Agent, or Firm* — Barnes & Thornburg, LLP; Tina M. Dorr

(57) ABSTRACT

An apparatus (1) for treating containers (100) advancing along a linear direction (A-A), the apparatus (1) comprising:
- a first linear guide (2) developing parallel to the linear direction (A-A) and being fixedly located in a first environment (30) that is a controlled-contamination environment;
- a carriage (3) rotatably coupled to said first linear guide (2);
- a first supporting element (4) for supporting one container (100) by its neck (100*a*), the first supporting element (4) being integrally mounted on the carriage (3);
- a second linear guide (6) developing parallel to said linear direction (A-A) and being fixedly located in a second environment (40) separated from the first environment (30);
- a slider (7) slidably coupled to the second linear guide (6), the slider (7) and the carriage (3) being magnetically or electromagnetically coupled.

11 Claims, 6 Drawing Sheets

APPARATUS FOR TREATING CONTAINERS ADVANCING ALONG A LINEAR DIRECTION

The present invention relates to an apparatus for treating containers advancing along a linear direction.

The proposed invention finds application in the pharmaceutical industry, in particular for transporting vials within a clean room.

Another field of application is the food industry, in particular the bottling sector and, more specifically, bottling using aseptic technology where containers are moved within a clean room.

For example, a reference sector for the present invention is the bottling of so-called "sensitive" food products, i.e. products that are particularly sensitive to bacteriological contamination and oxidation, such as, for example, isotonic drinks, juices, nectars, soft drinks, tea, milk-based beverages, coffee-based beverages, etc., for which avoiding possible microbiological contamination throughout all packaging steps is of fundamental importance.

The present invention relates in particular to bottling lines with aseptic technology where maintaining sterility is of fundamental importance. However, the present invention can also be used in non-aseptic filling and capping systems.

In general, the main issue in moving objects within a clean room is linked to the interfaces of the clean room with the outer environment for allowing the passages of the drive systems and at the same time preventing contaminants from entering the clean room.

Another goal is maintaining the overall volume of the clean room as small as possible.

From document DE 102014102630 A1 it is known a drive system arranged outside a clean room and designed to move an inner transport element located within the clean room by means of a magnetic or electromagnetic interaction. Both the drive system and the inner transport element comprise carriages mounted on corresponding rails which are mutually parallel and in contact with a separation vertical wall delimiting the clean room.

Another solution, disclosed in document U.S. Pat. No. 11,498,781, proposes a transport device located in the clean room and magnetically coupled to a drive element designed as an autonomous vehicle which is located outside the clean room.

The known solutions are either not versatile or too complex.

In this context, the technical task underpinning the present invention is to provide an apparatus for treating containers advancing along a linear direction, which obviates the drawbacks of the prior art mentioned above.

In particular, it is an object of the present invention to propose an apparatus for treating containers advancing along a linear direction, the apparatus being at the same time versatile, reliable, and simple.

The defined technical task and the specified aims are substantially achieved by an apparatus for treating containers advancing along a linear direction, the apparatus comprising:

- a first linear guide developing parallel to the linear direction and being fixedly located in a first environment that is a controlled-contamination environment;
- a carriage rotatably coupled to the first linear guide;
- a first supporting element for supporting one container by its neck, said first supporting element being integrally mounted on the carriage;

- a second linear guide developing parallel to the linear direction and being fixedly located in a second environment;
- a slider slidably coupled to the second linear guide, the slider and the carriage being magnetically or electromagnetically coupled;
- at least one separation wall for separating the first environment from the second environment, said first linear guide being arranged at a first predefined distance from separation wall.

According to one embodiment of the invention, the separation wall is located at a predefined height from a ground level. In particular, the second linear guide is arranged below the separation wall and the first linear guide is arranged above the separation wall or vice versa.

Preferably, the separation wall has at least one inclined portion.

According to a preferred embodiment, the apparatus further comprises a second supporting element for supporting one container by its neck. The second supporting element is integrally mounted on the carriage.

Preferably, the carriage comprises:

- a framework having a stand developing towards the separation wall;
- a plurality of wheels rotatably mounted on the framework;
- a case supported by the stand.

In particular, the case is magnetically or electromagnetically coupled to the slider.

According to one aspect of the invention, the case and the slider do not contact the separation wall.

In particular, the case is a plate-like body arranged in the first environment so as to face an inner surface of the separation wall and the slider is a plate-like body arranged in the second environment so as to face an external surface of the separation wall.

Preferably, the first linear guide comprises a first rail and a second rail which are mutually parallel.

The plurality of wheels comprises a first pair of wheels rotatably coupled to the first rail and a second pair of wheels rotatably coupled to the second rail.

In one embodiment, each wheel of said first pair of wheels is a double flange wheel having a groove. The first rail comprises an edge developing parallel to the linear direction from which two inclined surfaces originate. The edge of the first rail fits in the grooves of the corresponding wheels of the first pair of wheels.

The second rail has a flat upper surface, each wheel of the second pair of wheels being configured to roll on the flat upper surface.

In another embodiment, each wheel of said second pair of wheels is also a double flange wheel having a groove. The second rail comprises an edge developing parallel to the linear direction from which two inclined surfaces originate. The edge of the second rail fits in the grooves of the corresponding wheels of the second pair of wheels.

Preferably, the apparatus further comprises at least one interlock element fixedly mounted on the carriage and configured to partially enwrap one of the rails.

In one embodiment, the case comprises at least a first magnet and the slider comprises at least a second magnet.

In another embodiment, the slider comprises a ferromagnetic material and the case comprises at least one magnet.

In another embodiment, the case comprises a ferromagnetic material and the slider comprises at least one magnet.

According to one aspect of the invention, the apparatus further comprises:

- a box delimiting the first environment, the separation wall being a bottom wall of said box;
- a sterilizing unit configured to sterilize the containers;
- a rinsing unit configured to rinse the containers, the rinsing unit being located downstream the sterilizing unit;
- a filling unit configured to fill the containers with a fluid product, the filling unit being located downstream the rinsing unit;
- a closing unit configured to close the filled containers, the closing unit being located downstream the filling unit.

Further features and advantages of the present invention will more fully emerge from the non-limiting description of a preferred but not exclusive embodiment of an apparatus for treating containers advancing along a linear direction, as illustrated in the accompanying drawings, in which.

Figure 1:
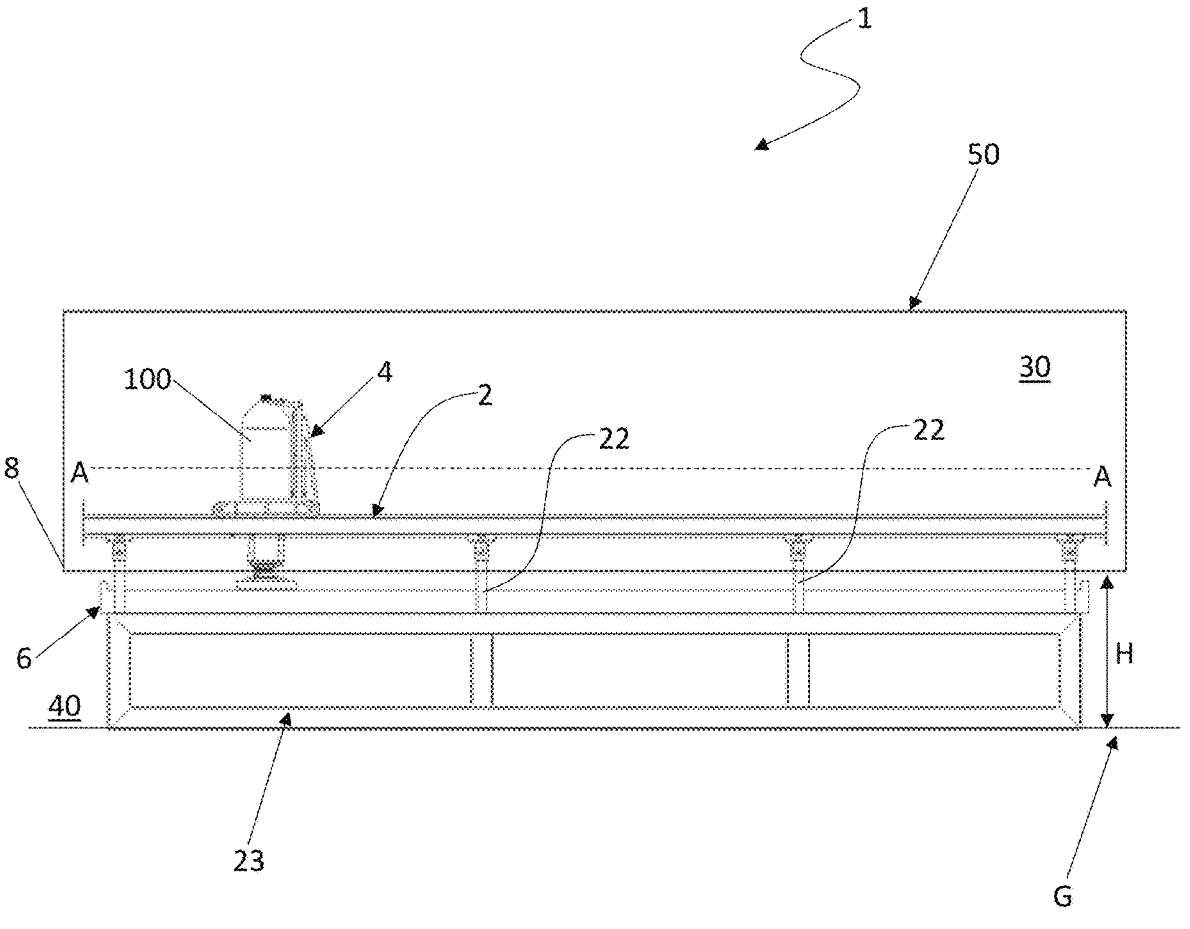
FIG. 1 illustrates a side view of an apparatus for treating containers advancing along a linear direction, according to the present invention.
Figure 2:
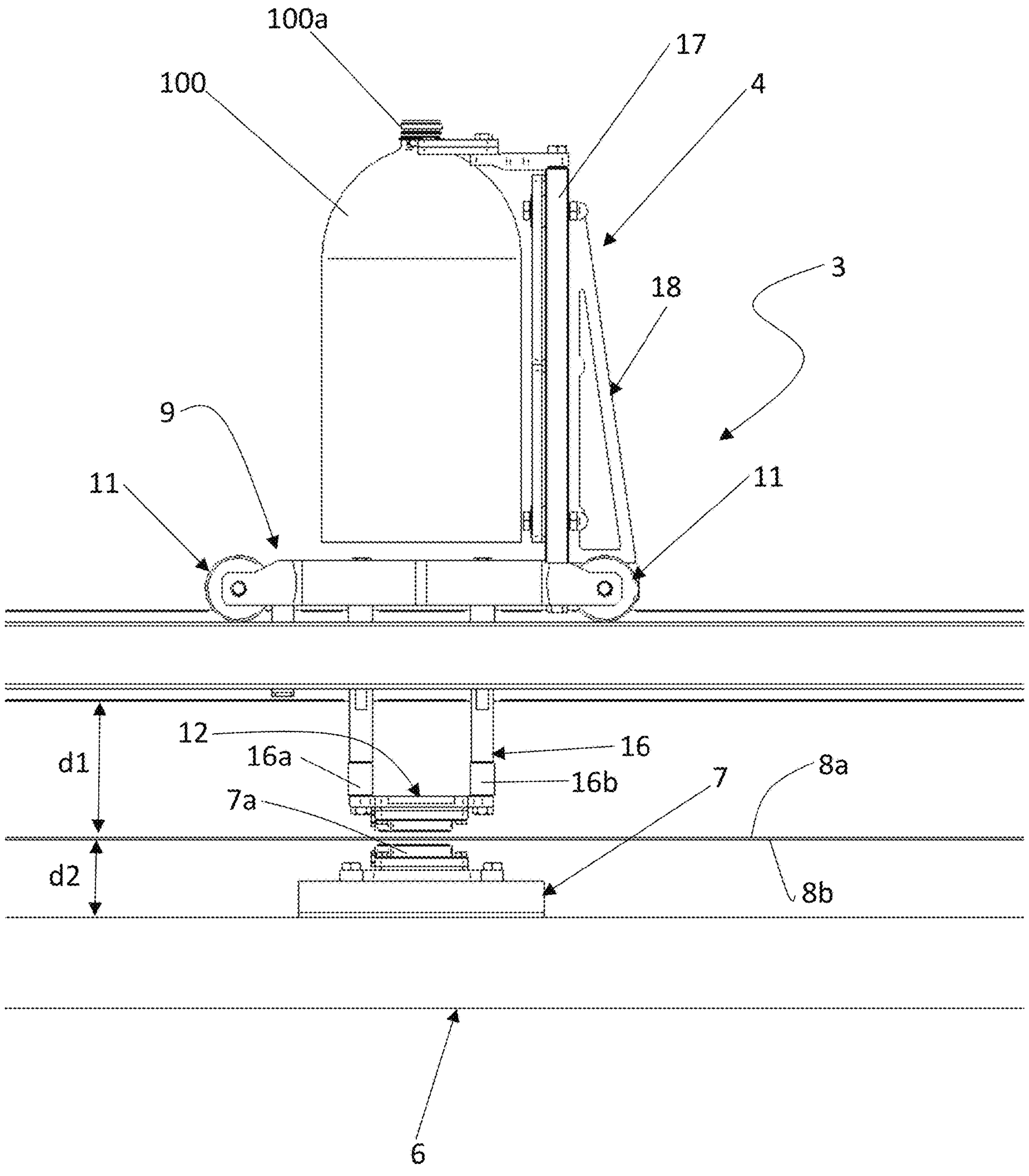
FIG. 2 illustrates an enlarged portion of part of the apparatus of FIG. 1.
Figure 3:
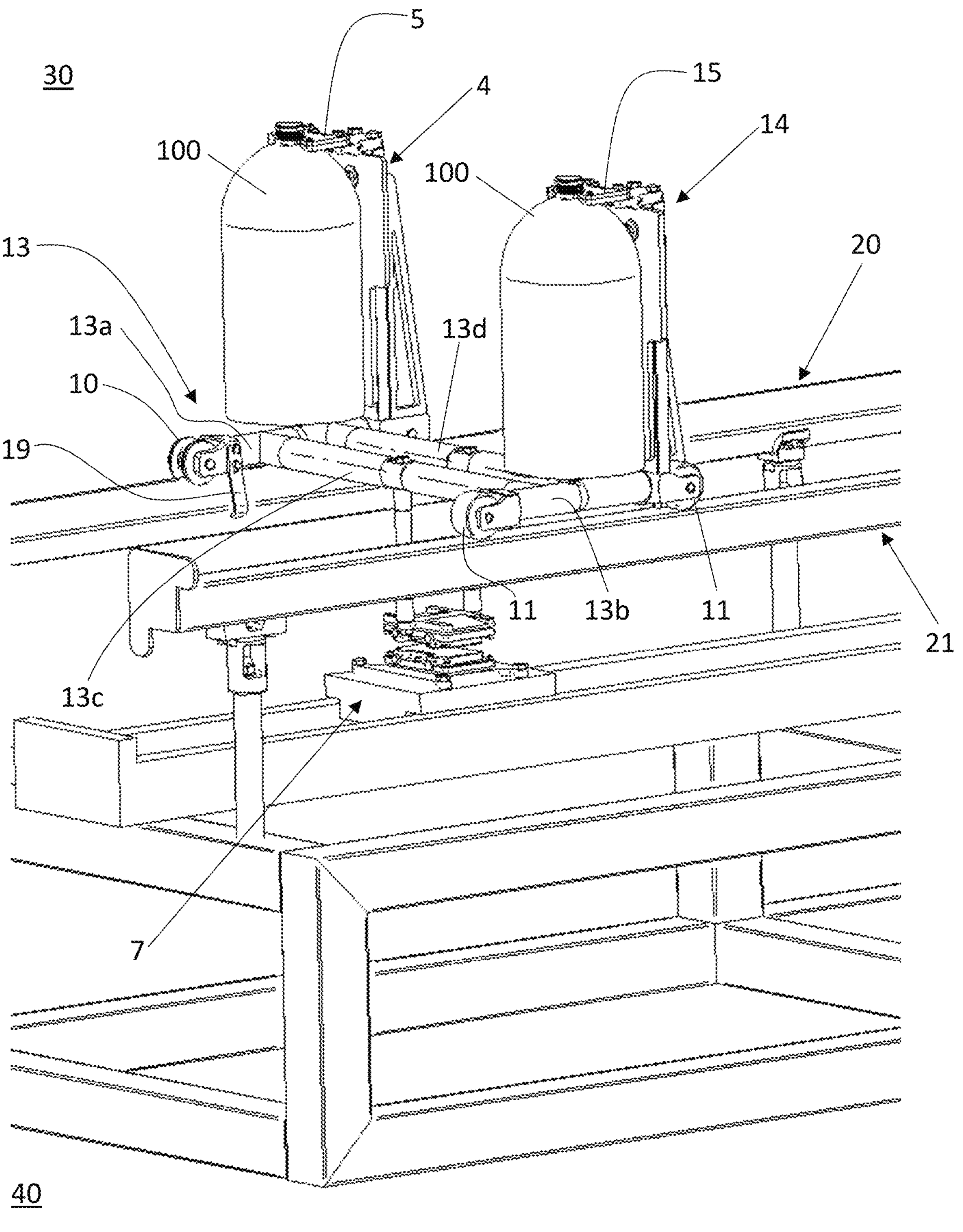
FIG. 3 illustrates a frontal perspective view of a pair of containers advancing in the apparatus of FIG. 1.
Figure 4:
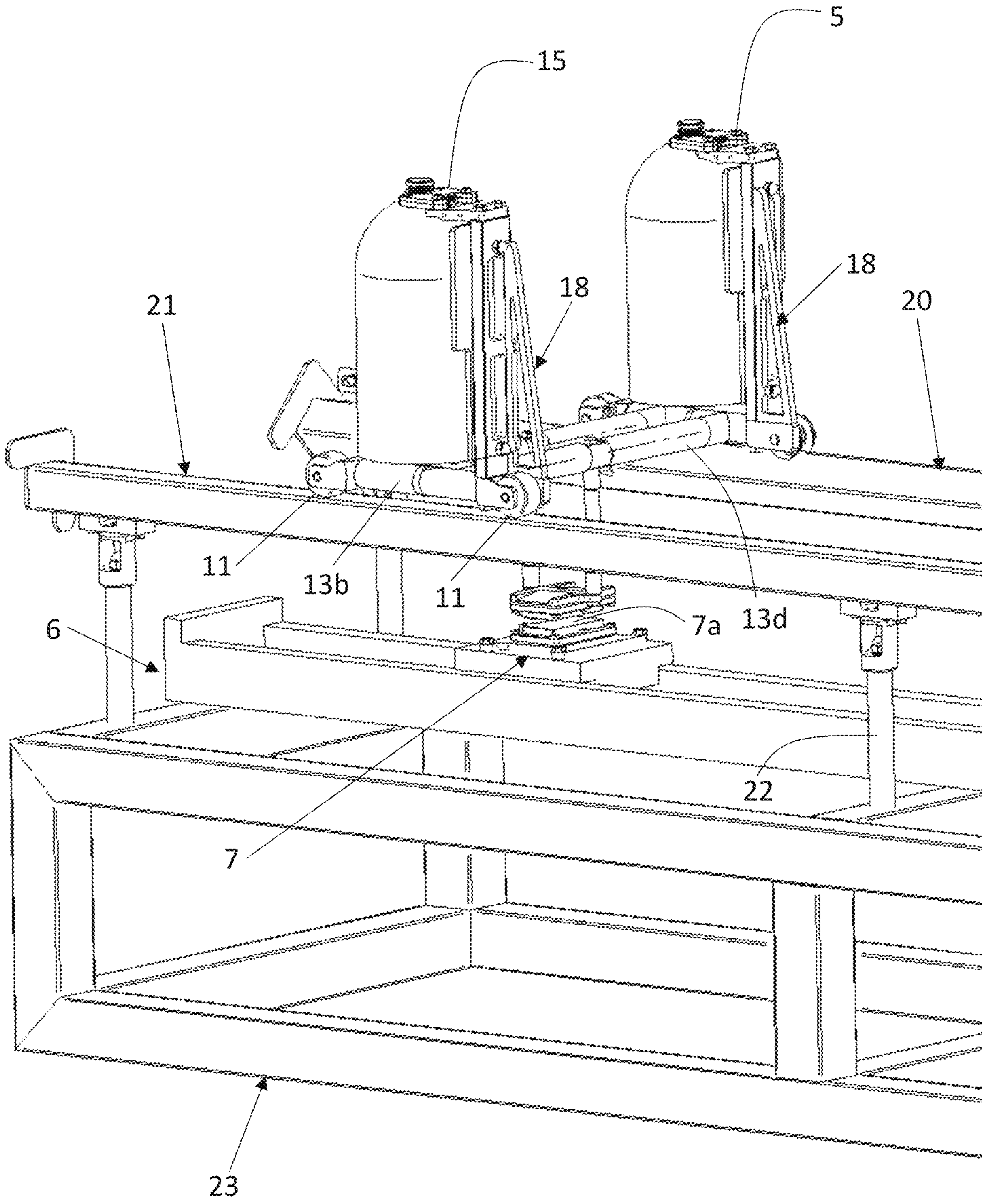
FIG. 4 illustrates a back perspective view of the pair of containers of FIG. 3.

With reference to the figures, number 1 indicates an apparatus for treating containers 100 advancing along a linear direction A-A.

In this context, the term container 100 indicates either a formed container or a parison made of thermoplastic material.

The apparatus 1 comprises a first linear guide 2 developing parallel to the linear direction A-A, and a carriage 3 rotatably coupled to the first linear guide 2.

The first linear guide 2 is fixedly located in a first environment 30 that is a controlled-contamination environment.

Therefore, also the carriage 3 is arranged in the first environment 30.

The apparatus 1 further comprises a first supporting element 4 for supporting one container 100 by its neck 100*a*. The first supporting element 4 is integrally mounted on the carriage 3 and is arranged in the first environment 30.

Preferably, the first supporting element 4 comprises a first gripper 5 for gripping the neck 100*a* of one of the containers 100.

According to a preferred embodiment, the apparatus 1 further comprises a second supporting element 14 for supporting one container 100 by its neck 100*a*. Analogously to the first supporting element 14, the second supporting element 14 is also integrally mounted on the carriage 3 and is arranged in the first environment 30.

Preferably, the second supporting element 14 comprises a second gripper 15 for gripping the neck 100*a* of one of the containers 100.

In an alternative embodiment (not illustrated), the first supporting element 4 and the second supporting element 14 comprise corresponding pockets for receiving the neck 100*a* of the containers 100.

In one embodiment of the invention, each of the supporting elements 4, 14 comprises a bar 17 supporting the corresponding gripper 5, 15 and a reinforcement structure 18 applied to the bar 17 for reinforcing it.

Each bar 17 has a main development in a direction which is orthogonal to the linear direction A-A. Each reinforcement structure 18 has a substantially triangular extension beside the corresponding bar 17.

The apparatus 1 further comprises a second linear guide 6 developing parallel to the linear direction A-A, and a slider 7 slidably coupled to the second linear guide 6.

The second linear guide 6 is fixedly located in a second environment 40, which is separated from the first environment 30.

Therefore, the slider 7 is also arranged in the second environment 40.

The second linear guide 6 is parallelly arranged with respect to the first linear guide 2.

Advantageously, the slider 7 and the carriage 3 are magnetically or electromagnetically coupled.

Even if magnetically coupled, the slider 7 and the carriage 3 are physically separated (i.e., not in contact) since they lie respectively in the second environment 40 and in the first environment 30.

The separation between the two environments 30, 40 is obtained by a separation wall 8 located at a predefined height H from a ground level G.

According to one embodiment of the invention, the separation wall 8 has at least one inclined portion 81. In particular, the inclined portion 81 is inclined with respect to the ground level G, which is a floor or a terrain.

In this context, the first environment 30 is also referred to as "inner environment", whereas the second environment 40 is also referred to as "outer environment".

As said, the inner environment 30 is a controlled-contamination environment.

In the separation wall 8 two surfaces are identified, that are:

- a first surface or inner surface 8*a*, which faces the inner environment 30; and
- a second surface or outer surface 8*b*, which faces the outer environment 40.

The first linear guide 2 and the carriage 3 are located in the inner environment 30.

In this context, the first linear guide 2 is also referred to as "inner guide".

According to one aspect of the invention, the first linear guide 2 is arranged in the first environment 30 at a first predefined distance $d_1$ from the separation wall 8. In particular, the first linear guide 2 does not contact the separation wall 8.

In this context, the second linear guide 6 is also referred to as "outer guide". According to one aspect of the invention, the second linear guide 6 is arranged in the second environment 40 at a second predefined distance $d_2$ from the separation wall 8. In particular, the second linear guide 6 does not contact the separation wall 8. In one embodiment, the second predefined distance $d_2$ is lower than the first predefined distance $d_1$.

In other words, the second linear guide 6 is closer to the separation wall 8 than the first linear guide 2.

According to the illustrated embodiment, the separation wall 8 divides the inner environment 30 which is located above the separation wall 8, from the outer environment 40 which is located below the separation wall 8.

In this embodiment, the first linear guide 2 is arranged at a higher height than the predefined height H of the separation wall 8 with respect to the ground level G.

The second linear guide 6 and the slider 7 are located in the outer environment 40, thus below the separation wall 8.

According to another embodiment (not illustrated), the separation wall 8 divides the inner environment 30 which is located below the separation wall 8, from the outer environment 40 which is located above the separation wall 8.

In this embodiment, the second linear guide 6 and the slider 7 are located in the outer environment 40, thus above the separation wall 8, whereas the first linear guide 2 is located in the inner environment 30, thus below the separation wall 8.

According to one aspect of the invention, the carriage 3 comprises:

- a framework 9;
- a plurality of wheels 10, 11 rotatably mounted on the framework 9;
- a case 12 supported by the framework 9 and magnetically coupled to the slider 7.

Preferably, the framework 9 has a substantially T-shape in cross-section. In particular, the framework 9 comprises a chassis 13 and a stand 16 originating from the chassis 13 and developing towards the separation wall 8.

Preferably, the supporting elements 4, 14 are mounted on the chassis 13 at an opposite side with respect to the stand 16.

In particular, the bars 17 and the reinforcement structures 18 are mounted on the chassis 13 at an opposite side with respect to the stand 16.

The chassis 13 has an extension that is substantially parallel to the ground level G. Assuming the ground level G as a horizontal plane, the chassis 13 has also a horizontal extension.

In the illustrated embodiment, the chassis 13 comprises a tubular structure of four tubular pieces 13*a*, 13*b*, 13*c*, 13*d*. In particular, a first and a second tubular pieces 13*a*, 13*b* are mutually parallel and they are also parallel to the linear direction A-A. A third and a fourth tubular pieces 13*c*, 13*d* are mutually parallel and they are orthogonal to the linear direction A-A.

The third and fourth tubular pieces 13*c*, 13*d* are arranged to connect to first tubular piece 13*a* to the second tubular piece 13*b*.

The stand 16 is arranged to connect the chassis 13 to the case 12.

In the illustrated embodiment, the stand 16 comprises two further tubular pieces, identified here as a fifth tubular piece 16*a* and a sixth tubular piece 16*b*.

The fifth tubular piece 16*a* has one end connected to the third tubular piece 13*c* and another end connected to the case 12.

The sixth tubular piece 16*b* has one end connected to the fourth tubular piece 13*d* and another end connected to the case 12.

The case 12 and the slider 7 are separated by the separation wall 8.

Preferably, both the case 12 and the slider 7 do not contact the separation wall 8.

The case 12 is preferably a plate-like body arranged in the first environment 30 so as to face the inner surface 8*a* of the separation wall 8.

In other words, the case 12 is supported by the stand 16 in a position which is suspended above the separation wall 8.

The slider 7 is preferably a plate-like body arranged in the second environment 40 so as to face the outer surface 8*b* of the separation wall 8.

According to one embodiment of the invention, the case 12 comprises at least a first magnet 12*a* and the slider 7 comprises at least a second magnet 7*a*.

Preferably, both the case 12 and the slider 7 comprises a plurality of magnets having alternate polarities.

According to one aspect of the invention, the case 12 is tight-sealed.

According to another embodiment of the invention, the slider 7 comprises a magnet and the case 12 comprises a ferromagnetic material.

According to another embodiment of the invention, the case 12 comprises a magnet and the slider 7 comprises a ferromagnetic material. As said, the carriage 3 is rotatably coupled to the first linear guide 2.

The first linear guide 2 comprises a first rail 20 and a second rail 21 that are mutually parallel. These rails 20, 21 are also parallel to the linear direction A-A.

Figure 5:
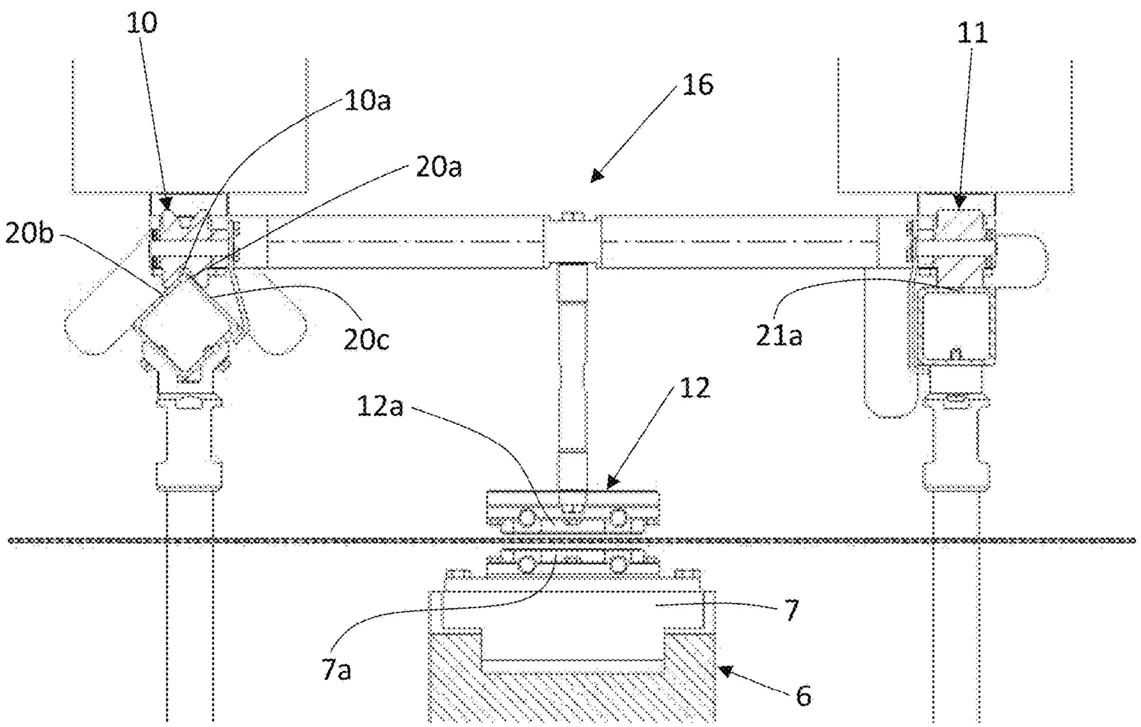
FIG. 5 illustrates one embodiment of the rails of the first linear guide of the apparatus of FIG. 1, in a cross-sectional view.

The wheels 10, 11 of the carriage 3 are rotatably coupled to the rails 20, 21. In particular, a first pair of wheels 10 is rotatably coupled to the first rail 20, and a second pair of wheels 11 is rotatably coupled to the second rail 21. According to an embodiment of the invention, illustrated in FIG. 5, the first rail 20 comprises an edge 20*a* developing parallel to the linear direction A-A. From the edge 20*a* originate two inclined surfaces 20*b*, 20*c* of the first rail 20.

The edge 20*a* is arranged towards the carriage 3, in particular towards the first pair of wheels 10.

Each wheel of the first pair of wheels 10 is a double flange wheel having a groove 10*a* that is shaped so as fit on the edge 20*a* of the first rail 20. The double flange wheels 10 contact the inclined surfaces 20*c*, 20*c* while rolling along the first rail 20.

The second rail 21 has a flat upper surface 21*a* which faces the carriage 3, in particular the second pair of wheels 11.

Each wheel of the second pair of wheels 11 is configured to roll on the flat upper surface 21*a*.

According to one aspect of the invention, the first rail 20 and the second rail 21 are identical but they are differently oriented in the first environment 30.

In particular, the two rails 20, 21 are tubular elements with a square or rectangular cross-section, and they are oriented with a mutual phase shift of 45° with respect the linear direction A-A.

The choice of coupling the double flange wheels 10 with the edge 20*a* of the first rail 20 serves to define more precisely the advancing movement of the overall carriage 3.

Figure 6:
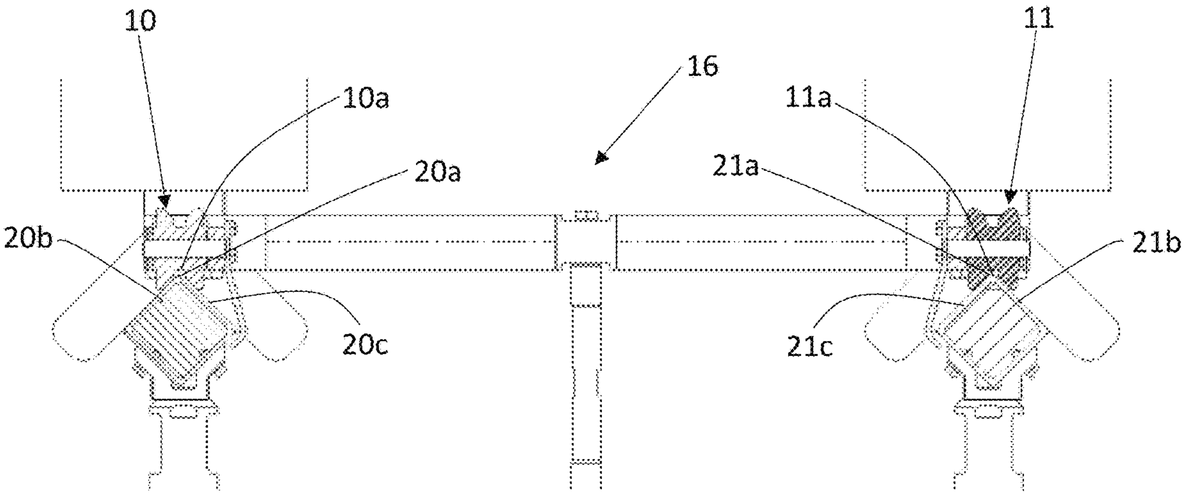
FIG. 6 illustrates another embodiment of the rails of the first linear guide of the apparatus of FIG. 1, in a cross-sectional view.
Figure 7:
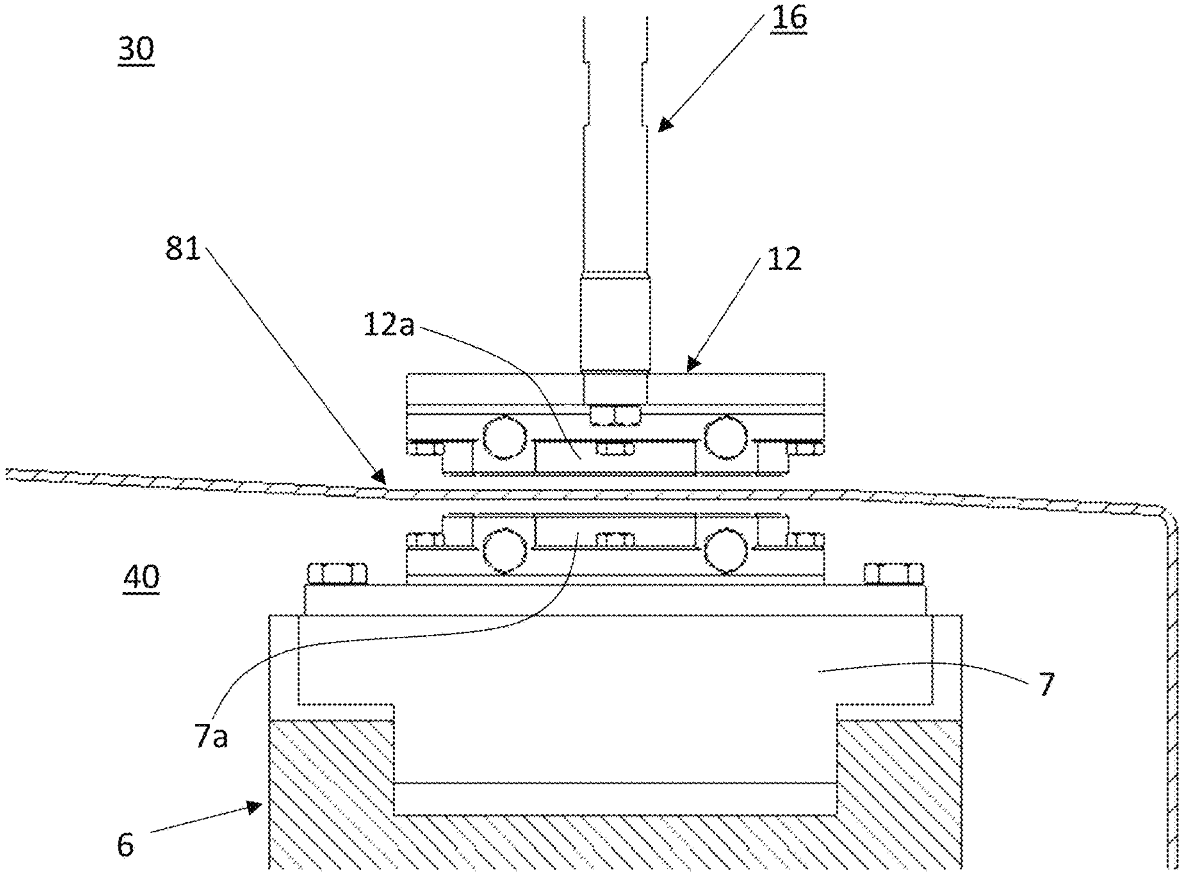
FIG. 7 illustrates an enlarged portion of the slider and the case of the apparatus of FIG. 1, in a cross-sectional view.

According to an alternative embodiment, shown in FIG. 6, the second rail 21 is identical to the first rail 20, meaning that it has an edge developing parallel to the linear direction A-A and two inclined surfaces originating from said edge.

In this alternative embodiment, the wheels of the second pair of wheels 11 are identical to the wheels of the first pair of wheels 10. In particular, each wheel of the second pair of wheels 11 is a double flange wheel so as to fit on the edge of the second rail 21.

In this alternative embodiment, the two rails 20, 21 are preferably identical and they have the same orientation in the first environment 30.

In particular, the second rail 21 comprises an edge 21*a* developing parallel to the linear direction A-A. From the edge 21*a* originate two inclined surfaces 21*b*, 21*c* of the second rail 21.

The edge 21*a* is arranged towards the carriage 3, in particular towards the second pair of wheels 11.

Each wheel of the second pair of wheels 11 is a double flange wheel having a groove 11*a* that is shaped so as fit on the edge 21*a* of the second rail 21.

The double flange wheels 11 contact the inclined surfaces 21*c*, 21*c* while rolling along the second rail 21.

This alternative embodiment achieves an even more precise advancing movement of the overall carriage 3.

In the embodiments described above, the carriage 3 is simply rotatably coupled to the first linear guide 2. This means that the wheels 10, 11 lie and roll on the rails 20, 21.

In another embodiment, the carriage 3 is also connected to the first linear guide 2 by at least one interlock element 19 In particular, the interlock element 19 is a bracket fixedly mounted on the chassis 13 and configured to partially enwrap one of the rails 20, 21, for example the first rail 20.

Accordingly, the carriage 3 can slide on the inner guide 2 with the bracket 19 also sliding along the first rail 20. This prevents the carriage 3 from falling down the chassis 13 in case of misalignments.

In another embodiment, there could be more interlock elements 19 in order to increase the reliability of the connection between the carriage 3 and the inner guide 2.

The apparatus 1 comprises holding means 22 for supporting the rails 20, 21. In particular, the holding means 22 comprises pillars for supporting the rails 20, 21.

In one embodiment, illustrated in FIG. 1, the pillars 22 are integrally mounted on a base structure 23 which also supports the outer guide 6.

The base structure 23 lies on the ground level G.

In another embodiment, not illustrated, the pillars 22 are anchored to the ground level G.

The apparatus 1 further comprises motorized means (not illustrated) that are operatively active on the slider 7 to make it slide on the second linear guide 6.

The motorized means are of the known type, for example a pneumatic cylinder or an electric motor.

The motorized means are configured to drive the slide 7 in a direction which is parallel to the linear direction A-A, either in one way or on the opposite.

In the illustrated embodiment, the apparatus 1 comprises a box 50 delimiting the first environment 30. In particular, the separation wall 8 is a bottom wall of the box 50.

In particular, the box 50 consists in an isolation device which is configured to physically separate the inner environment 30 from the outer environment 40.

In a preferred embodiment, the apparatus 1 comprises a heating unit configured to heat the containers 100.

Downstream the heating unit there is arranged a sterilizing unit configured to sterilize the containers 100. In particular, the sterilizing unit is configured to sterilize the containers 100 by dispensing hydrogen peroxide on them.

The heating unit upstream the sterilizing unit aims at avoiding the hydrogen peroxide to condense on the surfaces of the containers 100.

Downstream the sterilizing unit, there is a rinsing unit configured to rinse the containers 100 by using sterile air.

Downstream the rising unit, the containers 100 are filled with a fluid product by a filling unit.

Preferably, a layer of nitrogen is deposited on top of the level of fluid in the containers 100. This is obtained by a dosing device configured to dose nitrogen.

The apparatus 1 further comprises a closing unit configured to apply closures or caps to the filled containers 100.

The functioning of the apparatus for treating containers advancing along a linear direction, according to the present invention, is described below.

The containers 100 are fed by pairs to an inlet of the apparatus 1. For example, the feeding may be performed manually by a human operator or by a robot.

It is assumed one pair of containers 100 is fed to the grippers 5, 15 mounted on the carriage 3.

The slider 7 is initially actuated by the motorized means so as to slide on the second linear guide 6 on a forward way, which means that the slider 7 moves away from the inlet of the apparatus 1.

Accordingly, the two containers 100 supported by the grippers 5, 15 advance along the linear direction A-A thanks to the magnetic coupling of the case 12 with the slider 7.

Upon advancing along the linear direction A-A in the first environment 30, the containers 100 are subject to a sequence of treatment—heating, sterilizing, rinsing, filling, dosing of nitrogen, closing.

In a preferred embodiment, the slider 7 is then actuated on a back way on the second linear guide 6, which means that the slider 7 moves back to the inlet of the apparatus 1.

Thus, the closed containers 100 are discharged at the inlet of the apparatus 1. The discharge may be performed manually by a human operator or by a robot.

In another embodiment, the containers 100 are discharged at an outlet of the apparatus 1 the containers 100, either by a human operator or a robot.

The slider 7 is then actuated on a back way on the second linear guide 6, which means that the slider 7 moves back to the inlet of the apparatus 1.

Accordingly, the case 12 is moved back towards the inlet of the apparatus 1, where the grippers 5, 15 may receive a new pair of containers 100.

The characteristics of the apparatus for treating containers advancing along a linear direction, according to the present invention, are clear from the description, as are the advantages.

In particular, the containers are moved within the controlled-contamination environment thanks to the magnetic coupling of the carriage with the slider located outside the controlled-contamination environment.

The arrangement of the inner guide with the rails at a predefined distance from the separation (bottom) wall allows the carriage (and therefore the containers) to move independently from the specific shape and irregularities of the separation wall (or bottom wall).

The attraction forces between the inner block and the outer slider are counterbalanced by the rails and the relative holding means (pillars).

The proposed apparatus is versatile since it allows to perform a plurality of treating operations (i.e. heating, sterilizing, rising, filling, etc.) in aseptic conditions.

The invention claimed is:

1. An apparatus for treating containers advancing along a linear direction, said apparatus comprising:

- a first linear guide developing parallel to said linear direction and being fixedly located in a first environment that is a controlled-contamination environment;
- a carriage rotatably coupled to said first linear guide;
- a first supporting element for supporting one container by a neck of the container, said first supporting element being integrally mounted on the carriage;
- a second linear guide developing parallel to said linear direction and being fixedly located in a second environment;

a slider slidably coupled to the second linear guide, said slider and said carriage being magnetically or electromagnetically coupled; and at least one separation wall for separating the first environment from the second environment, said first linear guide being arranged at a first predefined distance from said at least one separation wall;

wherein said carriage comprises:

a framework having a stand developing towards the separation wall;

a plurality of wheels rotatably mounted on the framework;

a case supported by the stand, said case being magnetically or electromagnetically coupled to said slider;

wherein the first linear guide comprises a first rail and a second rail which are mutually parallel, said plurality of wheels comprising a first pair of wheels rotatably coupled to said first rail and a second pair of wheels rotatably coupled to said second rail; and wherein each wheel of said first pair of wheels is a double flange wheel having a groove, said first rail comprising an edge developing parallel to the linear direction from which two inclined surfaces originate, the edge of the first rail fitting in the groove of corresponding wheels of the first pair of wheels.

2. The apparatus according to claim 1, wherein said at least one separation wall is located at a predefined height from a ground level, said second linear guide being arranged below said at least one separation wall and said first linear guide being arranged above said at least one separation wall or vice versa.

3. The apparatus according to claim 1, wherein said separation wall has at least one inclined portion.

4. The apparatus according to claim 1, further comprising a second supporting element for supporting one container by a neck of the container, said second supporting element being integrally mounted on the carriage.

5. The apparatus according to claim 1, wherein the case and the slider do not contact the at least one separation wall.

6. The apparatus according to claim 1, wherein the case is a plate-like body arranged in the first environment so as to face an inner surface of the at least one separation wall and the slider is a plate-like body arranged in the second environment so as to face an external surface of the at least one separation wall.

7. The apparatus according to claim 1, wherein the second rail has a flat upper surface, each wheel of the second pair of wheels being configured to roll on the flat upper surface.

8. The apparatus according to claim 1, wherein each wheel of said second pair of wheels is a double flange wheel having a groove, said second rail comprising an edge developing parallel to the linear direction from which two inclined surfaces originate, the edge of the second rail fitting in the groove of each wheel of the second pair of wheels.

9. The apparatus according to claim 1, further comprising at least one interlock element fixedly mounted on the carriage and configured to partially enwrap one of the first rail or the second rail.

10. The apparatus according to claim 1, wherein said case comprises at least a first magnet and said slider comprises at least a second magnet.

11. The apparatus according to claim 1, wherein said slider comprises a ferromagnetic material and said case comprises at least one magnet.

* * * * *